(12) United States Patent
Gardrat et al.

(10) Patent No.: US 11,082,349 B2
(45) Date of Patent: Aug. 3, 2021

(54) SYSTEM AND METHOD FOR OPTIMIZING COMMUNICATION LATENCY

(71) Applicant: NovaSparks, Inc., New York, NY (US)

(72) Inventors: Pierre Gardrat, Paris (FR); Olivier Baetz, Brooklyn, NY (US); Antoine Colinet, Paris (FR)

(73) Assignee: NovaSparks, Inc., New York, NY (US)

( * ) Notice: Subject to any disclaimer, the term of this patent is extended or adjusted under 35 U.S.C. 154(b) by 92 days.

(21) Appl. No.: 16/385,835

(22) Filed: Apr. 16, 2019

(65) Prior Publication Data
US 2019/0319887 A1 Oct. 17, 2019

Related U.S. Application Data

(60) Provisional application No. 62/658,158, filed on Apr. 16, 2018.

(51) Int. Cl.
*G01R 31/08* (2020.01)
*H04L 12/853* (2013.01)
(Continued)

(52) U.S. Cl.
CPC ......... *H04L 47/2416* (2013.01); *G06Q 40/04* (2013.01); *H04L 41/5022* (2013.01);
(Continued)

(58) Field of Classification Search
None
See application file for complete search history.

(56) References Cited

U.S. PATENT DOCUMENTS

| 7,899,749 B1 | 3/2011 | Studnitzer et al. |
| 8,102,877 B1 * | 1/2012 | Liu ............. H04L 47/805 370/468 |

(Continued)

FOREIGN PATENT DOCUMENTS

| CN | 107872369 A | 4/2018 |
| WO | WO 2017/178397 | 10/2017 |

OTHER PUBLICATIONS

International Search Report and Written Opinion dated Jul. 30, 2019 in connection with International Application No. PCT/US2019/027626.

(Continued)

*Primary Examiner* — Gerald A Smarth
(74) *Attorney, Agent, or Firm* — Wolf, Greenfield & Sacks, P.C.

(57) ABSTRACT

Aspects of the present disclosure provide techniques for reducing latency in distributing market data from a first location to one or more other locations over a wired or wireless transmission line. Some embodiments provide techniques for transmitting market data messages at a data transfer rate less than or equal to a predetermined target data transfer rate. Some embodiments provide techniques for transmitting only the most recent updates for a particular financial instrument. Some embodiments provide techniques which reduce or eliminate the need to recover a packet lost over the transmission line. Some embodiments provide techniques for aggregating data from multiple updates for a particular financial instrument into a single message for transmitting.

20 Claims, 4 Drawing Sheets

(51) Int. Cl.
*G06Q 40/04* (2012.01)
*H04L 12/841* (2013.01)
*H04L 12/24* (2006.01)
*H04L 12/825* (2013.01)
*H04L 12/927* (2013.01)

(52) U.S. Cl.
CPC ............ *H04L 47/25* (2013.01); *H04L 47/283* (2013.01); *H04L 47/805* (2013.01)

(56) References Cited

U.S. PATENT DOCUMENTS

| | | | |
|---|---|---|---|
| 8,121,923 B1* | 2/2012 | Ruccolo | G06Q 20/102 |
| | | | 705/35 |
| 8,433,642 B2 | 4/2013 | Duquette et al. | |
| 8,438,300 B2 | 5/2013 | Gershinsky et al. | |
| 9,036,654 B2 | 5/2015 | Wisehart | |
| 9,443,269 B2 | 9/2016 | Battyani | |
| 9,742,679 B2 | 8/2017 | Eberle et al. | |
| 9,767,514 B2 | 9/2017 | Lee et al. | |
| 9,807,024 B2* | 10/2017 | Shpiner | H04L 47/122 |
| 2009/0063360 A1 | 3/2009 | Callaway et al. | |
| 2009/0103434 A1* | 4/2009 | Madsen | H04L 47/10 |
| | | | 370/232 |
| 2012/0224481 A1* | 9/2012 | Babiarz | H04L 41/5022 |
| | | | 370/230.1 |
| 2013/0058212 A1* | 3/2013 | Noy | H04L 1/18 |
| | | | 370/230 |
| 2013/0226764 A1 | 8/2013 | Battyani | |
| 2014/0297844 A1* | 10/2014 | Kancherla | H04L 43/16 |
| | | | 709/224 |
| 2015/0301108 A1* | 10/2015 | Hamid | G06F 11/2205 |
| | | | 714/724 |
| 2016/0095132 A1* | 3/2016 | Hodroj | H04L 47/522 |
| | | | 370/235 |
| 2016/0337252 A1* | 11/2016 | Eberle | H04L 49/9031 |
| 2017/0063704 A1* | 3/2017 | Krinsky | H04B 17/309 |
| 2017/0103457 A1 | 4/2017 | Acuña-Rohter et al. | |
| 2018/0121103 A1* | 5/2018 | Kavanagh | G06F 3/067 |

OTHER PUBLICATIONS

International Preliminary Report on Patentability dated Oct. 29, 2020 in connection with International Application No. PCT/US2019/027626.

PCT/US2019/027626, Oct. 29, 2020, International Preliminary Report on Patentability.

* cited by examiner

SYSTEM AND METHOD FOR OPTIMIZING COMMUNICATION LATENCY

CROSS REFERENCE TO RELATED APPLICATIONS

This application claims the benefit under 35 U.S.C. § 119(e) of U.S. Provisional Application Ser. No. 62/658,158, filed Apr. 16, 2018, and entitled, "SYSTEM AND METHOD FOR OPTIMIZING COMMUNICATION LATENCY," which is incorporated herein by reference in its entirety.

BACKGROUND

Markets provide market information to participants, such as banks, brokers, trading firms, and/or others, through electronic market data feeds. The market data information typically includes information participants rely on to interact with the market, such as information about buy or sell orders sent by the participants to the market, details about trades executed by the market, and/or the status of various financial instruments in the market. Trade details may include the prices and/or quantities involved in the each trade executed, such as for instances when the market matched a sell order with a buy order. Instrument statuses may include an indication of whether a particular financial instrument can be traded at a given moment in time.

When providing market information to participants, market data feeds are often tasked with delivering a high volume of data, and may be subject to data bursts. During a data burst, a market data feed may need to deliver data at a rate substantially higher than the average rate at which the feed typically operates. For example, a burst data rate may be up to 4 times greater than the average data rate. Moreover, market data typically needs to be processed with minimal delay, such as on the order of nanoseconds, in order to be useful for participants. For example, in high frequency trading, a participant may want to perform several trades per second, and excessive delay may cause the data the participant needs to perform the trades to no longer be accurate upon reaching the participant.

One or more market data feed handlers may be implemented to streamline the distribution of market data to participants. A market data feed handler may include a processing system configured to consolidate market information from one or more markets, and/or pertaining to a particular group of financial instruments, into a stream of messages to be sent to participants. Feed handlers are typically co-located with the markets, such as in a same data-center.

While some feed handlers output to participants in messages individual buy or sell orders for various financial instruments, more advanced feed handlers can build order books of buy or sell orders for each financial instrument and instead output updates to order books on the participant end. An order book for a particular financial instrument typically includes a dual-sorted list of levels, with one side for ask prices and one side for bid prices. The ask price of a financial instrument may be the price requested by a seller of the instrument, and the bid price may be the price offered by a buyer of the instrument. Each level of the order book may include a price, a quantity, and a number of orders, so as to aggregate multiple orders of the instrument on a same side when the orders share a same price. The information stored in the levels may be obtained directly from market updates, or alternatively may be built from a list of active orders for each financial instrument. On the participant end, a participant may choose to include only the first level of an order book. For example, first level may list the most highest bid price and/or the lowest ask price, which may be the most useful information to the participant. In such a case, the feed handler may be configured for Level 1 (L1) publication. Alternatively, a participant may include more levels on each side such as 5 or 10 levels. In such instances, the feed handler may be configured for Level 2 (L2) publication.

Feed handlers may be implemented in software or in hardware, such as by using one or more field programmable gate arrays (FPGAs). FPGA-based feed handlers offer a desirable low-latency profile for processing the market data stream. FPGA-based feed handlers also reduce the overall latency between the market and participants. In some instances, multiple market data feeds can be processed by multiple FPGAs within a matrix of FPGAs.

SUMMARY

In accordance with some aspects, a network appliance comprises one or more digital logic hardware elements configured to receive market data from a first location at a first data transfer rate, and transmit, to a second location different from the first location over a wireless transmission line, a plurality of messages based on the market data, at a second data transfer rate less than or equal to a predetermined data transfer rate, wherein the predetermined data transfer rate is less than the first data transfer rate.

In some embodiments, the one or more digital logic hardware elements may comprise a rate limiter configured to regulate the second data transfer rate to ensure that the second data transfer rate is less than or equal to the predetermined data transfer rate.

In some embodiments, the rate limiter may be configured to set the predetermined data transfer rate based on a maximum data transfer rate detected for the wireless transmission line.

In some embodiments, the one or more digital logic hardware elements may comprise a conflation module, including an order book memory configured to store updated order book information from the market data, and one or more trade buffers configured to store updated trade information from the market data.

In some embodiments, the conflation module may be configured to aggregate trades from first and second messages of the market data for a first financial instrument at a first price into a first message to be sent to the second location.

In some embodiments, the conflation module may be configured to update a first quantity of the first financial instrument at the first price in the one or more trade buffers to include a second quantity of the first financial instrument at the first price, and the first quantity may be indicated in the first message received at a first time and the second quantity may be indicated in the second message received at a second time later than the first time.

In some embodiments, the conflation module may be configured to store, in the order book memory, a first order book update for a first financial instrument, store, in the order book memory, a second order book update for the first financial instrument, and prioritize the second order book update over the first order book update in a next order book update message.

In some embodiments, the one or more digital hardware elements may comprise an encoder module configured to serialize the plurality of messages over the wireless transmission line in a manner which includes a status for each financial instrument in the order book memory.

In some embodiments, the network appliance may further comprise one or more integrated circuits including the one or more digital hardware elements.

In some embodiments, the one or more integrated circuits may comprise one or more field programmable gate arrays (FPGAs).

In accordance with some aspects, a method comprises receiving, from a first location at a first time at a first data transfer rate, a first update for a first financial instrument, receiving, from the first location at a second time later than the first time at the first data transfer rate, a second update for the first financial instrument, and transmitting a message indicative of the second update to a second location different from the first location over a wireless transmission line at a second data transfer rate less than or equal to a predetermined data transfer rate, wherein the predetermined data transfer rate is less than the first data transfer rate.

In some embodiments, the method may further comprise prioritizing the second update over the first update upon receiving the second update, wherein the first update includes a first order book update and the second update includes a second order book update.

In some embodiments, the first order book update may indicate a first bid price for the first financial instrument and the second order book update indicates a second bid price different from the first bid price, and/or the first order book update may indicate a first ask price for the first financial instrument and the second order book update indicates a second ask price different from the first ask price.

In some embodiments, the first update may include a first trade update for the first financial instrument, and the second update may include a second trade update for the first financial instrument.

In some embodiments, the first trade update may indicate a first quantity of the first financial instrument, the second trade update may indicate a second quantity of the first financial instrument, and the message indicative of each of the second update may include a sum of the first and second quantities.

In some embodiments, the method may further comprise storing, after the first time and before the second time, the first update in an order book memory, and storing, after the second time, the second update in the order book memory.

In some embodiments, the method may further comprise including, in the message indicative of the second update, a status update for each financial instrument in the order book memory.

In some embodiments, the method may further comprise, after transmitting the message indicative of the second update, transmitting another message including another status update for each financial instrument in the order book memory.

In some embodiments, the method may further comprise determining, at a third time later than the second time, that transmitting the message indicative of the second update would exceed the predetermined data transfer rate, and transmitting, at a fourth time later than the third time, the message indicative of the second update.

In some embodiments, prioritizing the second update over the first update may comprise not transmitting a message indicative of the first update.

DETAILED DESCRIPTION

Figure 1:
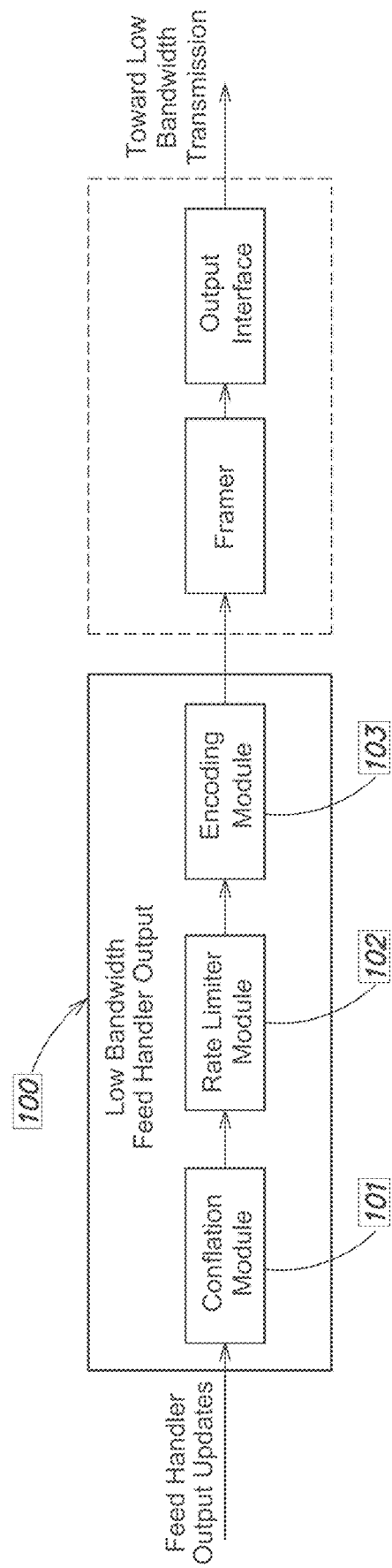
FIG. 1 illustrates an exemplary data transmission system configured to aggregate and normalize data to be sent over a transmission line, in accordance with some embodiments of the technology described herein.

In practice, participants such as banks and trading firms often consume market information from one market while located at another market. In some instances, participants may implement arbitrage strategy between correlated assets, such as trading a same instrument in different markets to take advantage of the different prices for the same instrument. In such cases, the faster the data is transported to and from the different markets and/or participants, the faster the participants can exploit the price difference. As a result, wireless transmission lines such as wireless networks may be preferable over optical fiber lines due to the speed increase available through wireless lines. For example, wireless lines may be 30% faster than optical fiber lines because light travels faster in air than through glass or other optical fiber materials.

On the other hand, wireless lines are often more expensive than optical fiber lines, and are limited in terms of bandwidth (e.g., data transfer rate), the latter of which can cause delays and/or data losses. Such delays and/or data losses may, at times, cause the market data transmitted over the wireless lines to be useless. For example, conventional market data distribution models, such as those using multicast technology for data transmission, may transmit data from one origin to many destinations, or from many origins to many destinations. In such systems, the average bandwidth utilized to transport market data under normal conditions may be fairly small, such as under 100 Mb/sec, when calculated over a long period of time, such as several minutes. However, the inventors recognized that when analyzing the traffic over smaller periods of time, such as under a millisecond, extremely high burst profiles may be observed, such as on the order of several Gb/sec. Burst activity can be even higher during times of high market volatility. During a data burst which exceeds the bandwidth limit of a multicast system, multicast packets carrying market data may need to wait, such as in a queue, before they may be sent. Further, some multicast packets may be dropped, causing holes in the feed where information was lost.

The inventors have recognized that packet delay, such due to queueing, is undesirable because it adds latency, causing participants to wait in order to receive the market data. As a non-limiting example, during a day of market data (e.g., NASDAQ data), the activity of 8 of the most liquid financial instruments (e.g., those most frequently traded and/or updated) sent via a 10 Mb/s wireless line can create a queuing delay of over 5 ms, rendering the wireless line useless during active periods of the market day. Participants expect to receive the most recent updates, rather than updates that are hundreds of microseconds or even milliseconds old from waiting in a queue to be transmitted. In the latter case, a participant may miss important information about a particular financial instrument shortly before trading the instrument.

The inventors have also recognized that packet drop is undesirable because it may result in holes in the market information received at the participant end that could render the received information unusable. Wireless lines, such as those which use radio frequency (RF) technologies such as microwave technology, are also subject to packet drops more often than optical fiber lines. For example, wireless lines may be impacted by bad weather conditions, animals (e.g., birds), or other such factors. And, while some wireless line provider use various techniques in attempt to limit packet losses and/or to recover lost data, such techniques still result in a packet drop rate far higher than large bandwidth optical fiber lines. Moreover, recovery of lost data is often done using an optical fiber line, which may result in a delay on the order of milliseconds to recover a packet.

Conventional solutions to address this problem when the market data is distributed locally (e.g., at the market location) simply increase the available network bandwidth, such as by matching the bandwidth of the data transmission line to the size of the largest burst to be expected. This is possible because, when the market feed data is being distributed locally (e.g., at or very close to the market data center), the data may be transmitted using high speed switches having data transfer rates as high as 10 Gb/s, 40 Gb/s, 100 Gb/s, or higher. However, the inventors have recognized that, when the data is distributed to remote locations (e.g., to other market locations), this approach would require significant computing power and network resources. Furthermore, it may require purchasing, at a high cost, use of long distance telecommunication services from a telecommunication provider, such as to distribute the data over the provider's optical fiber networks.

As a result, some known techniques attempt to maximize data throughput in a wireless line for a given bandwidth limit, such as by using different bandwidth optimization techniques. For example, such optimization techniques may limit the amount of bandwidth consumed by one of several users of the wireless line by coupling a first-in-first-out (FIFO) buffer to a rate limiter for each user, the rate limiter sending as many packets as may be sent at a given time, and the FIFO buffer queueing all of the packets that the rate limiter cannot send at that time. Such techniques may also notify a user when the user's allocated bandwidth has been consumed, such as using Ethernet Pause Frames. However, these techniques have not resolved the delay and packet loss issues observed during market data burst conditions, and so participants continue to be affected.

In some known techniques, when a participant is located at another market location and needs to obtain the market data through a wireless line, the participant may decide to use a feed handler before the market data is sent over the wireless lines, which may reduce the number of instruments for which the data is sent. However, even in this case, the amount of information to be sent still may be too high to avoid queueing delays, because the data bursts may be caused by a very small number of instruments (e.g., those which are most frequency traded).

Furthermore, some techniques implement the feed handler in software. In such techniques, there is an expectation that, because queued data may be accessed on-the-fly through adaptively coded signal paths rather than through established hardware lines, queuing while waiting for transmission should be decreased. However, in the end, the overall latency from the market to the participant is actually worse when the feed handler is implemented in software.

To overcome the problems identified in existing systems and methods, the inventors have developed techniques to reduce the amount of latency generated in a feed handler between markets and participants, such as when the feed handler sends messages (e.g., including book updates) to participants through wireless lines. Some embodiments of the technology described herein provide high volume data communication systems which may adapt the amount of information coming from a feed handler to the bandwidth of available wireless lines. As a result, queueing, and hence the overall latency, may be reduced. Moreover, systems described herein may be configured to prioritize the most recent information updates over older information updates in determining which will be sent first over the wireless lines. In addition, the systems may be configured to encode the information updates such that there is no need to recover a lost packet, which removes the delay associated with such recovery over optical fiber lines. Such systems may be implemented to utilize one of the above described techniques alone or in combination with other techniques described herein, in accordance with various embodiments.

Some embodiments provide a low latency feed handler that may be implemented by one or more FPGAs. The feed handler may build order books so as to only send book updates over wireless lines. In accordance with various embodiments, a high data volume communication system may be implemented by the same FPGA(s), or in one or more other FPGAs. Embodiments in which the systems share the same FPGA(s) exhibit low latency from low delays associated with inter-FPGA communication. In embodiments in which different FPGAs are used, components of the feed handler may be coupled via a low-latency switch.

In accordance with various embodiments, a low latency or other such feed handler may provide messages (e.g., including a normalized market stream of data) with substantially less or even no queuing, as compared to previous techniques, regardless of the rate at which information is provided by the feed. Such feed handlers may transmit the messages over wired lines such as optical fiber lines and/or laser, wireless lines such as RF (e.g., microwave or millimeter wave) networks, or other suitable transmission lines.

FIG. 1 illustrates exemplary data transmission system 100 configured to aggregate and normalize data to be sent over a transmission line, in accordance with some embodiments of the technology described herein. System 100 may be implemented by one or more FPGA(s), or other forms of digital logic hardware, in accordance with various embodiments. Additionally, system 100 may be configured to transmit data over various types of transmission lines such as wireless (e.g., RF) lines and/or wired (e.g., Ethernet, fiber optic) lines.

As shown in FIG. 1, system 100 includes conflation module 101, rate limiter 102, and encoding module 103. Conflation module 101 is coupled to the feed handler, and receives market data messages from the feed handler including market information. Conflation module 101 may be configured to aggregate and/or prioritize market information to be sent over the transmission line. Rate limiter 102 is coupled to conflation module 101 and may be configured to determine when and how much market information may be sent from conflation module 101 at any given time. Encoding module 103 is coupled to rate limiter 102 and may be configured to package the market information into normalized messages to be sent over the transmission line.

Conflation module 101 may be configured to store (e.g., cache) market data messages reviewed from the feed handler and to conflate and aggregate information from the messages. In some embodiments, conflation module 101 may be configured (e.g., programmed) to produce an output stream of market data, and to ensure that the output stream always contains the most recent information about each instrument.

Rate limiter 102 may be configured to regulate the output of system 100, such as by limiting the bandwidth of the output. In some instances, rate limiter 102 may detect and/or may be set with a target bandwidth (e.g., a target number of bytes), such that system 100 outputs only the target bandwidth in a given period of time to match the bandwidth target. In some embodiments, the bandwidth target may be set by a wireless line network, such as a bandwidth limit allocated to a given user, or an overall bandwidth limit of the line as a whole. In some embodiments, rate limiter 102 may be configured to detect available bandwidth and dynamically tailor output bandwidth to be less than or equal to the available bandwidth. Such a detection may be performed once to calculate a target bandwidth, or may be performed periodically to recalculate the target bandwidth upon further detection. In some embodiments, rate limiter 102 may be configured with various bandwidth targets (e.g., spaced over time), and may tailor the output bandwidth to the various targets (e.g., at the particular times). In some embodiments, rate limiter 102 may be configured to transmit, from conflation module 101, approximately the maximum amount of information possible given the bandwidth allocated to the participants in a wireless line. For example, rate limiter 102 may be configured to monitor the processing speed and available bandwidth on the wireless line to dynamically match the bandwidth of the output to the bandwidth of the wireless line.

Encoding module 103 may be configured to normalize, in a self-sufficient format, each message provided by rate limiter 102 from conflation module 101. In some embodiments, encoder module 103 may be configured to generate market data messages formatted in such a way that recovery of lost packets over the wireless line is unnecessary. In such embodiments, participants may seldom or never have to wait for a lost packet to be recovered. In some embodiments, the output of encoder module 103 may be coupled to a framer module configured to add transmission protocol headers to messages sent by encoder module 103, with the framer module coupled to an output interface module such as an Ethernet 1 Gb/s or 10 Gb/s interface coupled to the wireless line network. It should be appreciated that some embodiments do not include the framer module. For example, encoder module 103 may be directly coupled to the output interface module.

Figure 2A:
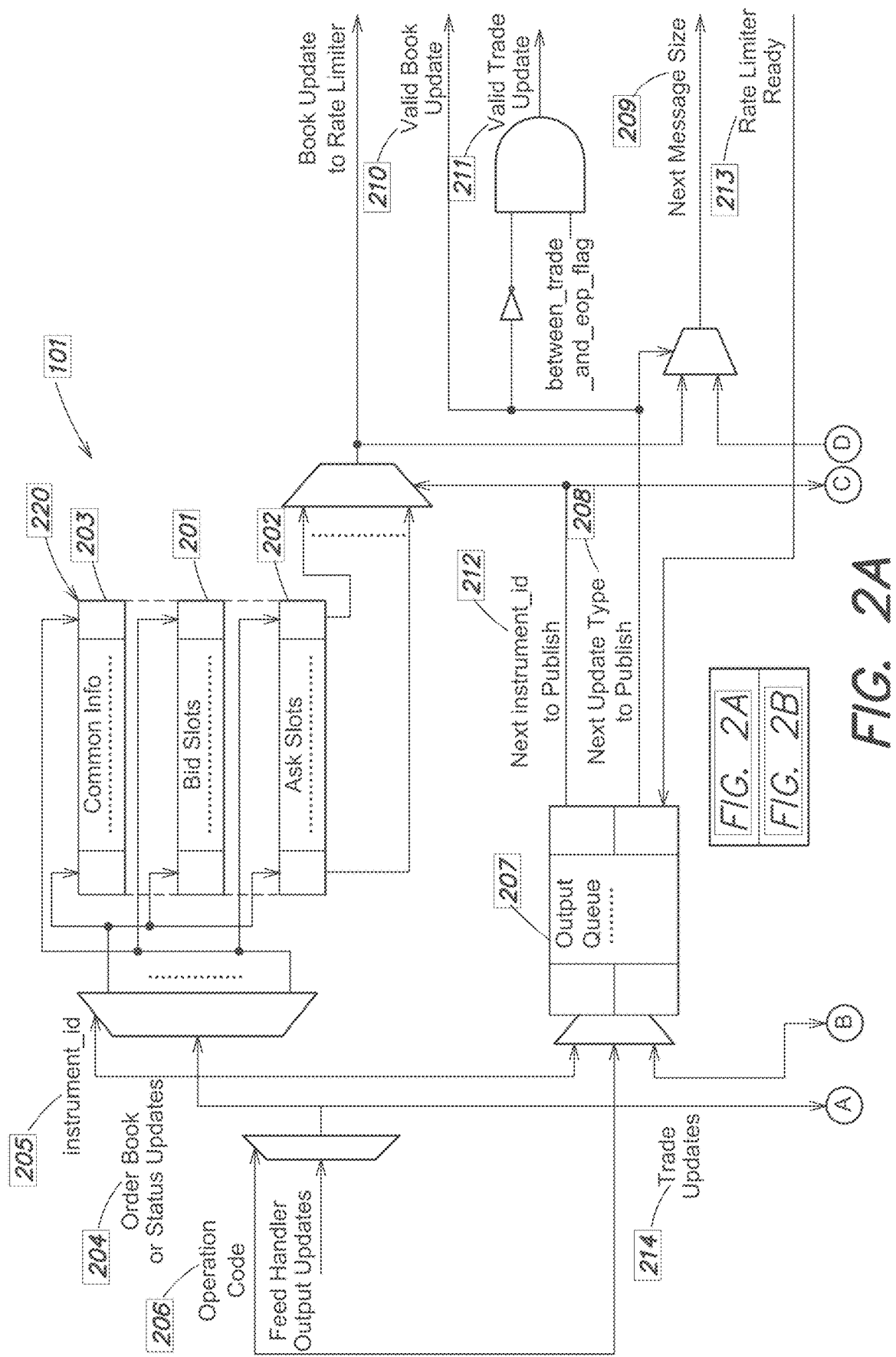
FIGS. 2A-2B are a circuit diagram of an exemplary conflation module, in accordance with some embodiments of the technology described herein.
Figure 2B:
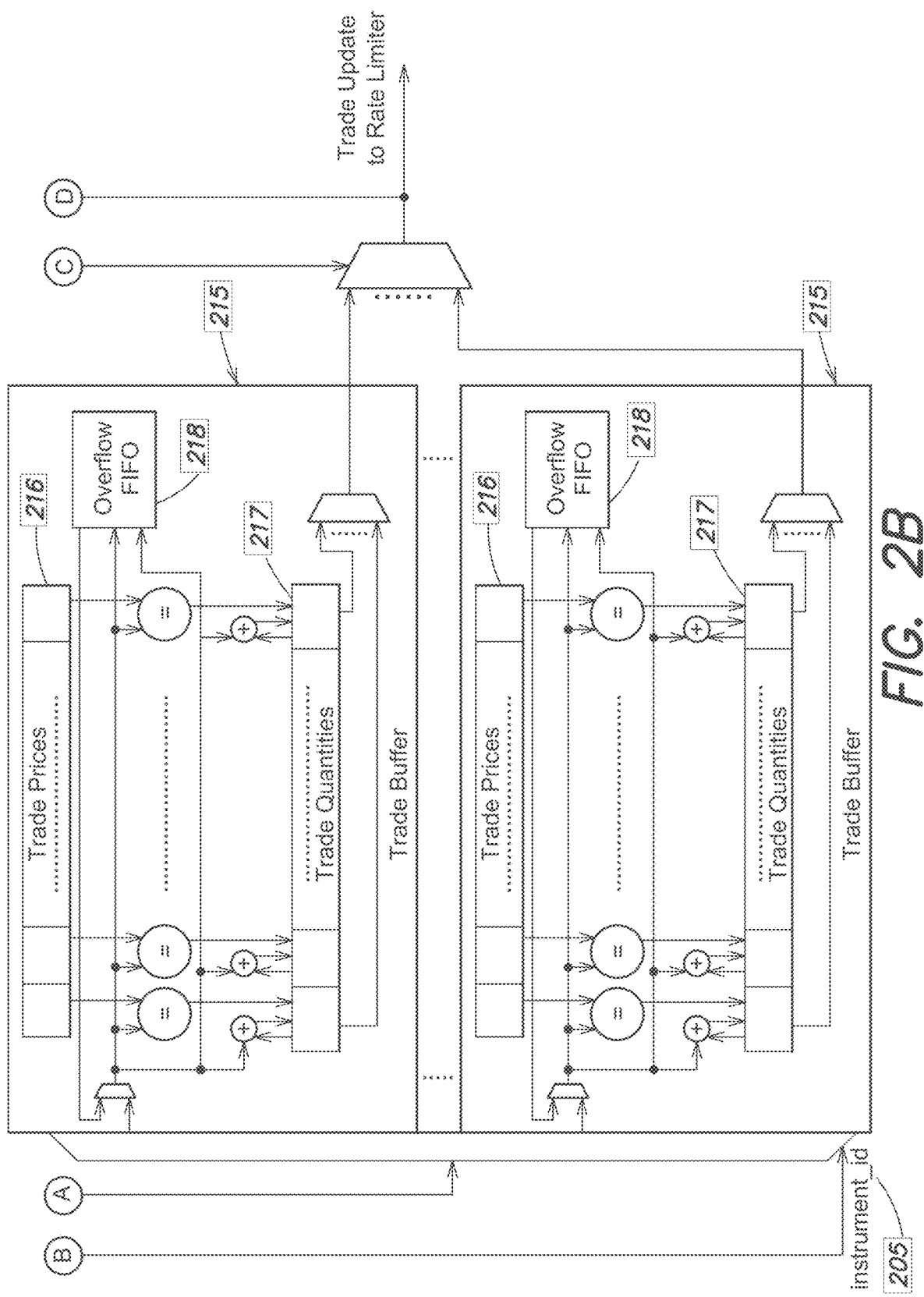

FIGS. 2A-2B are a circuit diagram of exemplary conflation module 101, in accordance with some embodiments of the technology described herein. Conflation module 101 includes order book memory 220, one or more trade buffers 215, and output queue 207. FIG. 2A illustrates some portions of conflation module 101 including order book memory 220 and output queue 207. FIG. 2B illustrates other portions of conflation module 101 including trade buffers 215. Order book memory 220 may be configured to store the most recent book updates such that they may be passed to rate limiter 102. Trade buffers 215, which may be provided for each financial instrument, may be configured to store trade information such that the trade information may be passed to rate limiter 102. Output queue 207 may indicate which updates are to be sent next to rate limiter 102 based on a stored update order. In some embodiments, order book memory 220, trade buffers 215, and output queue 207 may be formed on a single FPGA, or alternatively, across multiple FPGAs.

In some embodiments, conflation module 101 may be configured to treat order book updates and trade information differently to facilitate delivering the latest and most recent information about each financial instrument to participants. For example, updates from order book memory 220 may be given priority over updates from trade buffers 215 such that updates from order book memory 220 may be transmitted and some updates from trade buffers 215 may not be transmitted when rate limiter 102 indicates that there is not enough available bandwidth to transmit the entirety of both. In accordance with various embodiments, priority may be assigned to updates from order book memory 220 in output queue 207, or such priority may be ensured by the interconnections between the components of conflation module 101, such as the manner in which order book memory 220 and trade buffers 215 are coupled to rate limiter 102.

Order book memory 220 includes bid slots 201, ask slots 202, and common information slots 203. In some embodiments, particular bid slots 201, ask slots 202, and common information slots 203 may be allotted for various financial instruments. Bid slots 201 for a particular financial instrument may store one or more updated bid prices for that instrument, and ask slots 202 for the instrument may store one or more updated ask prices for the instrument, depending on what information was received from the feed handler since the last message was transmitted by system 100. Slots for common information 203 may include other miscellaneous information about the same instruments as bid slots 201 and/or ask slots 202 and/or others, such as a market timestamp (e.g., the time at which the change was made at the originating market) and/or a status of the instrument (e.g., an indication of whether the instrument may be traded, how much of the instrument may be bought and/or sold, etc.). In some embodiments, common information slots 203 for each instrument may include a pre-calculated message size for the instrument. In some embodiments, individual financial instruments may be assigned a unique identifier, such as an integer value instrument_id 205. Alternatively or additionally, conflation module 101 may be configured to process data differently in accordance with the type of information supplied by the data, with the type of information being indicated by a unique operation identifier, such as operation code 206, in the message received from the feed handler.

Order book memory 220 may be configured to hold only the most recent updates received from the feed handler. In some embodiments, upon receiving book status update 204 bearing operation code 206 for a particular instrument identified as instrument_id 205, conflation module 101 may overwrite data previously stored in memory 220 for instrument_id 205. For example, book status update 204 may contain information about instrument_id 205 such as an updated ask or bid price, and conflation module 101 may replace a level value in bid slots 201 or ask slots 202, corresponding to the updated side (e.g., ask or bid) of the order book, with the more recent ask or bid price. Alternatively or additionally, information stored in common information slots 203 for instrument_id 205 may also be replaced with updated information. In some instances, common information slots 203 may be updated to include an updated pre-calculated message size and/or an updated status of instrument_id 205. If memory 220 did not previously hold any information about instrument_id 205 upon receiving book status update 204, conflation module 101 may write instrument_id 205 and operation code 206 in output queue 207 to store an order book update message to be published on instrument_id 205. If memory 220 already held information about instrument_id 205 and operation code 206 to be published, conflation module 101 may avoid repeating the operation. For example, conflation module 101 may only update common information slots 203 of memory 220, such as the pre-calculated size of the output message.

In some embodiments, a status of each instrument (e.g., whether and what quantity of the instrument may be traded) may be included in each order book update message. The inventors have recognized that by providing a status of each instrument in each order book message update, participants may not be negatively impacted by a status update loss, for example due to a dropped packet. For example, when a status update is received by conflation module 101, the status update may be routed to order book memory 220. In some embodiments, the updated status for the particular instrument may be compared to the status stored in common information slots 203 and, if the statuses are different, the updated status may replace the stored status. In some instances, updating the status of the instrument may indicate to output queue 207 that a new message for instrument_id 205 having operation code 206 should be sent, even if the levels (e.g., ask prices and/or bid prices) of the order book are not different from the last order book update sent.

It should be appreciated that the number of bid slots 201, ask slots 202, and common information slots 203 allocated to a given financial instrument may vary in accordance with various embodiments. In some embodiments, each of bid slots 201, ask slots 202, and common information slots 203 may include enough slots to accommodate the maximum number of financial instruments for which system 100 may transmit messages. Alternatively or additionally, in some embodiments, bid slots 201 and/or ask slots 202 may include enough slots to accommodate the maximum number of levels for the particular side of the order book corresponding to bid or ask prices. For example, a participant may request L1 book updates including only the most interesting (e.g., highest) bid price and the most interesting (e.g., lowest) ask price for a given instrument, and so bid slots 201 and/or ask slots 202 may include a same number of slots as common information slots 203, such as one slot per instrument. Alternatively, the participant may request L2 or other updates such that multiple bid and/or ask prices are stored in bid slots 201 and/or ask slots 202 for a given instrument or for each instrument, such that there are more bid slots 201 and/or ask slots 202 allocated to one or more particular instruments than common information slots.

Trade buffers 215 may include slots for storing updated trade information received from the feed handler. For example, upon receiving trade update 214 associated with instrument_id 205 from the feed handler, conflation module 101 may route trade update 214 to a particular one of trade buffers 215 associated with instrument_id 205.

In some embodiments, trade buffers 215 may aggregate trades having a same price for a particular instrument when a trade update for that instrument has not yet been sent to rate limiter 102. For example, when trade update 214 for instrument_id 205 is received, the price indicated in trade update 214 may be compared to other trade prices 216 in the particular one of trade buffers 215. If the price indicated in trade update 214 does not match any other trade price 216 and there is an unallocated slot (e.g., for an updated trade price), then the price and quantity indicated in trade update 214 may be stored in the unallocated slot, with the slot updated to indicate that has been allocated. Instrument_id 205 and operation code 206 may be stored in output queue 207 indicating that a trade message should be sent with the new information. If the price indicated in trade update 214 matches one or more of trade prices 216, the quantity indicated in trade update 214 may be added to the quantity previously stored for that price in trade quantities 217. In this case, output queue 207 may not be notified of a new message to be sent, for example, because a trade may have already been indicated when the previous trade update having the price was received. Otherwise, if the price indicated in trade update 214 does not match any of trade prices 216 and there is no unallocated slot, the information indicated in trade update 214 may be added to overflow FIFO buffer 218. The information may be stored in overflow FIFO buffer 218 at least until a slot becomes available, and so the price may be added to trade prices 216 and the quantity may be added to trade quantities 217. Further, instrument_id 205 and operation code 206 may be added to output queue 207 indicating a new message to be sent with information from trade update 214. In some embodiments, when trade prices 216 and/or trade quantities 217 are updated, trade buffers 215 may pre-calculate and store trade message sizes based on the updated values stored in trade prices 216 and trade quantities 217.

In some embodiments, conflation module 101 may be configured to only send trade updates when an end of packet notification has been received from the feed handler, in order to prevent sending back-to-back messages for a same instrument using data from a same packet. For example, the inventors recognized the high probability (e.g., due to temporal locality) that multiple updates for a same instrument may be received over a short period, such as within a same packet. In such circumstances, sending a trade update before the end of the current packet may result in sending trade information at a particular price without including a total quantity of trades at that price from the current packet, such as omitting quantities to be received later in the packet. However, if the trade update is held until the end of the packet to be sent, then there is a decreased likelihood of needing to send a same trade price in consecutive updates because all quantities from the previous packet were included in the first update. Accordingly, trade buffers 215 may only indicate readiness to send to a trade update to rate limiter 102 when an end of packet notification has been received from the feed handler. In some embodiments, when conflation module 101 receives a trade update indicating a new packet has been received, trade buffers 215 may indicate that they are currently receiving information mid-packet and may not indicate readiness to send a trade update. Then, upon receiving an update with an operation code indicating the end of the packet, trade buffers 215 may indicate readiness to send a trade update. In some embodiments, when trade buffers 215 indicate readiness to send a trade update, next message size 209 may be extracted from trade buffers 215 specific to next instrument_id to publish 212. In some embodiments, when rate limiter 102 indicates readiness to receive a message, output queue 207 may trigger transmission of the trade update which followed the end of packet notification to rate limiter 102, and slots previously storing the sent trade update information may be changed to indicate that they are unallocated.

Output queue 207 may be configured to track which updates should be sent next from conflation module 101. For example, output queue 207 may be implemented as a simple first in first out (FIFO) protocol. When conflation module 101 determines than an order book update or a trade update should be sent, an indication of which order book information or trade information and which instrument should be sent may be provided to output queue 207. In the illustrative embodiment, instrument_id 205 and operation code 206 are provided to output queue 207 upon being received by conflation module 101. For example, conflation module may remove redundant or otherwise unnecessary entries from output queue 207. In some embodiments, conflation module 101 may reorder output queue 207 in accordance with an algorithm to prioritize certain entries over others. Upon receiving an indication that rate limiter 102 is ready to transmit a message, such as rate limiter ready 213, output queue 207 may provide next instrument_id to publish 212 and next update type to publish 208 to control which instrument information and which type of information is sent in the next message. In the illustrative embodiment, next update type to publish 208 controls whether an order book update from order book memory 220 or a trade update from trade buffers 215 is sent, and next instrument_id to publish selects an instrument. It should be appreciated that both updates may be sent to rate limiter 102 at the same time, such as if rate limiter 102 is able to send both updates in a same message. Further, next update type to publish 208 may be sent to rate limiter 102, such as via valid trade update 211 and valid order book update 210. In this illustrative embodiment, valid trade update 211 is an inverted version of next update type to publish 208, and valid order book update 210 is a non-inverted version. In some embodiments, next instrument_id to publish 212 provided by output queue 207 may indicate which slot in order book memory 220 and/or trade buffers 215 to use for the next update. For example, when rate limiter 102 indicates that there is enough bandwidth available to transmit a message of next message size 209 (e.g., the number of bytes indicated by the signal), output queue 207 may trigger transmission of the update to rate limiter 102.

It should be appreciated that, in some embodiments, output queue 207 may implement an algorithm to prioritize certain instruments in accordance with participant preferences. In some cases, a timeout mechanism may be employed to force publication for lower priority instruments once updates associated with such instruments have been in output queue 207 for a threshold amount of time (e.g., when delayed to accommodate high priority instruments). In some embodiments, output queue 207 may implement an algorithm to prioritize particular types of data. For example, trades may be given higher priority than order book updates or vice versa, and/or updates on level 1 (e.g., the most interesting entries at the top of the order book) have higher priority than updates on lower level of the order book. As alternative examples, the algorithm may prioritize a price increase on a particular level over a price decrease, a change of price on a particular level over a change of quantity, and so on.

As a non-limiting example of how an order book update may occur, conflation module 101 may be configured to handle 2 instruments, A & B, and to publish only 1 level of the order book (e.g., L1). In this case, conflation module 101 may only publish the highest bid price and the lowest ask price for each instrument, along with the latest information about the available quantity of each instrument.

At time $T_0$, output queue 207 may be empty and rate limiter 102 is not ready, indicating to conflation module 102 that nothing can be sent at this time. At time $T_1$, conflation module 101 may receive an update including 4 orders for a total of 150 of instrument A at a new highest bid price of $10. Conflation module 101 may store the updated bid information in bid slots 201 for instrument A and indicate to output queue 207 that an order book update including updated bid information should be sent for instrument A.

At time $T_2$, conflation module 101 may detect that output queue 207 is not empty and that an order book update for instrument A should be sent. In response, conflation module 101 may calculate the size of the message to be sent based on pre-calculated message sizes stored in common information slots 203 of order book memory 220 for instrument A. In this example, conflation module 101 may determine that a message of 10 Bytes should be sent, and informs rate limiter 102 that the message of 10 Bytes is ready to be sent. At time $T_3$, rate limiter 102 still may not be ready to send the message.

At time $T_4$, conflation module 101 may receive an update including 2 orders for a total of 40 of instrument B at a new lowest ask price of $850. Conflation module 101 may store the updated ask information in ask slots 202 for instrument B and indicate to output queue 207 that an order book update including updated ask information should be sent for instrument B.

At time $T_5$, conflation module may receive an update including 2 orders for a total of 10000 of instrument A at a new highest bid price of $11. In this instance, the received update indicates a new highest bid price of $11 for instrument A which is higher than the currently stored bid price of $10. Accordingly, conflation module 101 may replace the values in bid slots 201 for instrument A with the newly received value. In addition, conflation module 101 may detect that output queue 207 already indicates updated bid information for instrument A, and does not notify output queue 207 once again. For example, output queue 207 may indicate what type of information is to be sent rather than include the information to be sent, and so the indication need not change if the stored information indicated in output queue 207 is changed.

At time $T_6$, conflation module 101 may detect that the values used to calculate the message size to send the order book update for instrument A have been modified and updates the calculation. In this instance, conflation module 101 may determine that the message requires more bytes than previously calculated, such as 15 Bytes.

At time $T_7$, rate limiter 102 may determine that the message of 15 Bytes can be sent and indicates to conflation module 101 that it is ready. The most recent order book updates for instrument A (e.g., having the price of $11) may be sent to encoder module 103 via rate limiter 102 to be encoded and serialized to the transmission line. Conflation module 101 may remove the entry for instrument A from output queue 207. Then, conflation module 101 may detect the order book update for instrument B in output queue 207 and calculate that a message of 10 Bytes including this update should be sent. It should be appreciated that the first update for instrument A having the price of $10 was not sent. Rather, upon receiving a ready signal from rate limiter 102, only the most recent information having the price of $11 was sent.

As a non-limiting example of how a trade update may occur, conflation module 101 may be configured to publish information for financial instruments A and B. This example demonstrates how conflation module 101 may aggregate trade information for a same instrument at a same price before sending a trade update including the aggregated information.

At time $T_0$, the market may generate and transmit a packet with 4 messages including an execution report of 4 orders for a total of 100 of instrument A on the bid side of level 1 having a same bid price of $11. For example, the first message may include a first order execution for 40 of instrument A at the bid price of $11, the second message may include a second order execution for 30 of instrument A at the same price, the third message may include a third order execution for 20, and the fourth message may include a fourth order execution for 10.

At time $T_1$, the four messages may be processed by the feed handler to produce 5 normalized messages. For example, four of the messages may include information for the four order executions and the fifth message may include information for an order book update indicating L2 rather than L1 publication (e.g., to support an order quantity which may not be supported by L1).

At time $T_2$, the first message for the first executed trade may reach conflation module 101. In response, trade buffers 215 may allocate a slot in trade prices 216 for the new trade price on instrument A, but may not notify output queue 207 that a trade message should be sent. The allocated slot may indicate a trade for 40 of instrument A at a bid price of $11.

At time $T_3$, the second message for the second executed trade may reach conflation module 101. In response, trade buffers 215 may detect that the trade price indicated in the second message matches an allocated slot in trade prices 216. In this case, the quantity in the second message may be added to trade quantities 217 for instrument A corresponding to the bid price of $11. As a result, trade buffers 215 may now indicate a quantity of 70 at the bid price of $11 after combining the 40 of the first order with the 30 of the second order.

At time $T_4$, the third message for the third executed trade may reach conflation module 101. Trade buffers 215 may process the third message in the manner done for the second message. As a result, trade buffers 215 may indicate a quantity of 90 at the bid price of $11 after adding the 20 from the third order.

At time $T_5$, the fourth message for the fourth executed trade may reach conflation module 101. In the manner of the second and third messages, trade buffers 215 may be updated to indicate a quantity of 100 at the bid price of $11 for instrument A.

At time $T_6$, the fifth message including the order book update may reach conflation module 101 and order book memory 220 may be updated accordingly. An indication that the order book update is ready to be sent may be added to output queue 207.

At time $T_7$, an conflation module 101 may detect an end-of-packet command (e.g., in received operation code 206). As a result, conflation module 101 may indicate that a trade update for instrument A is ready to be sent.

At time $T_8$, rate limiter 102 may indicate readiness to send a message, and the order book update may be sent to rate limiter 102.

At time $T_9$, the trade update including information on all four order messages may be next in output queue 207. Conflation module 101 may calculates the size of the trade message and wait for rate limiter 102 to indicate readiness to send.

At time $T_{10}$, rate limiter 102 may indicate readiness to send a message, and a trade update may be sent to encoder module 103 indicating a quantity of 100 of instrument A at the bid price of $11. The trade information may be removed from output queue 207.

It should be appreciated that, in this example, conflation module 101 has provided the trade information received from the feed handler with reduced latency as compared to if the trade updates were to be queued upon being received. For example, by aggregating the four trades, a single message may be sent at once rather than sending multiple messages which would have to wait in the queue for bandwidth to be available. It should also be appreciated from this example that a participant more interested in receiving trade updates than order book updates would benefit from having an algorithm implemented by output queue 207 to prioritize trade updates accordingly.

It should be appreciated that the timing between events in the examples described herein may be on the order of nanoseconds. For example, updates may be received from the market over the course of hundreds of nanoseconds and rate limiter 102 may transmit multiple messages from conflation module 101 within a transmission period on the order of microseconds.

It should be appreciated that the amount of bandwidth consumed by conflation module 101 may depend on the number of financial instruments and/or the number of order book levels. For example, the number of instruments and/or order book levels may vary between participants as some participants request more or less data associated with greater or fewer numbers of instruments than others.

Figure 3:
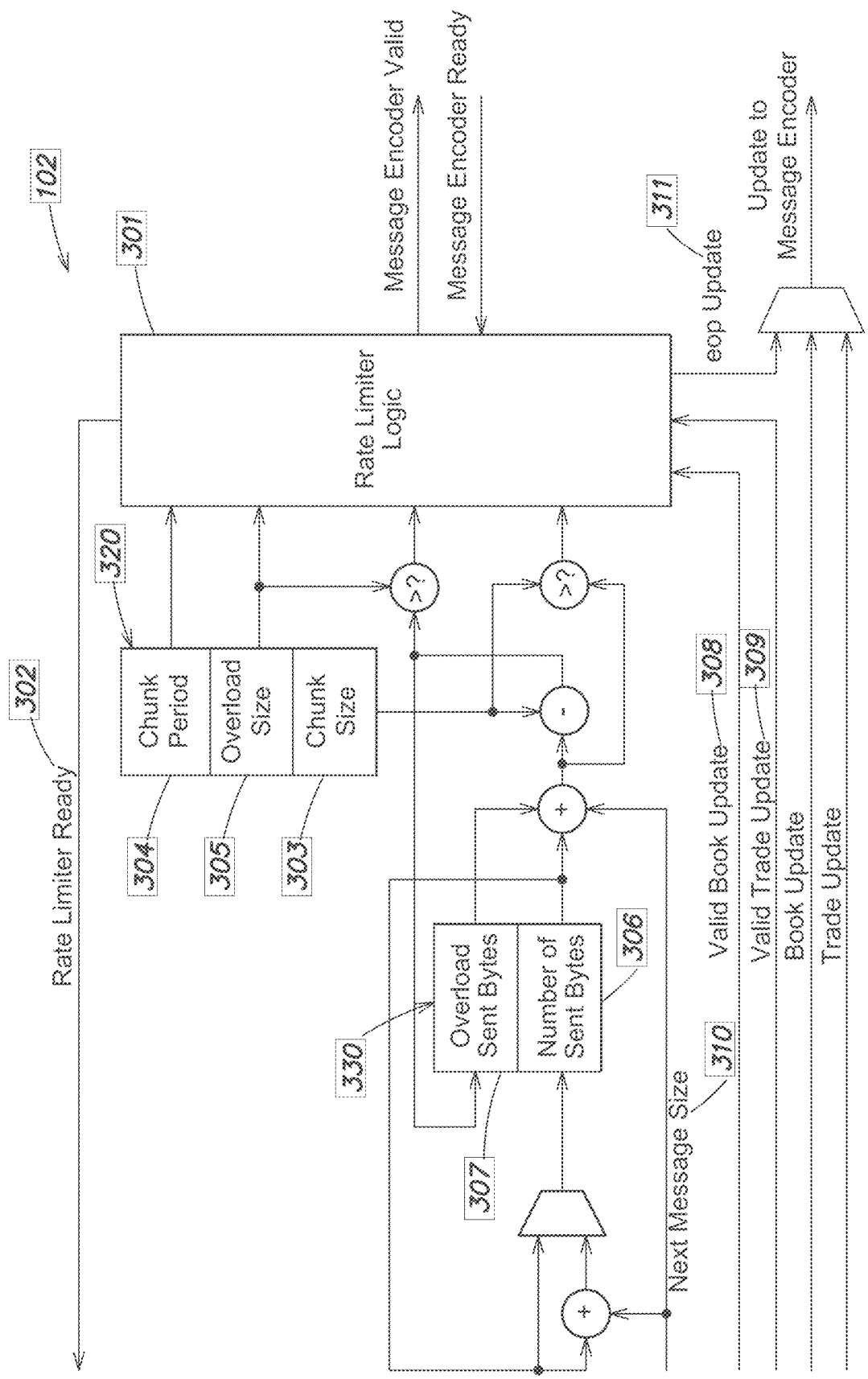
FIG. 3 is a circuit diagram of an exemplary rate limiter, in accordance with some embodiments of the technology described herein.

FIG. 3 is a circuit diagram of exemplary rate limiter 102, in accordance with some embodiments of the technology described herein. Rate limiter 102 includes rate limiter logic element 301, configuration registers 320, and state registers 330. Rate limiter 102 may be configured to determine when and how much data may be sent from conflation module 101 over the transmission line. For example logic element 301 may depend on data from configuration registers 320 and state registers 330 to make such a determination. Configuration registers 320 may store and provide values for logic element 301 to determine readiness to send a message. For example, logic element 301 may be configured to determine when to raise rate limiter ready indication 302 based on a combination of values from configuration registers 320 state registers 330.

Configuration registers 320 may include chunk size 303, chunk period 304, and overload size 305. Chunk size 303 may indicate the number of bytes that can be sent during chunk period 304. Chunk period 304 may indicate a period of time during which rate limiter 102 may not send more than the number of bytes indicated in chunk size 303. Overload size 305 may indicate a number of bytes rate limiter 102 may send over the limit set by chunk size 303 during chunk period 304. In some embodiments, each byte of overload size 305 used during chunk period 304 may be deducted from a byte budget allocated to the next period. In some embodiments, chunk size 303, chunk period 304, and/or overload size 305 may be set based on a target bandwidth to be maintained by rate limiter 102. In some embodiments, chunk size 303, chunk period 304, and/or overload size 305 may be adapted based on a detected maximum available bandwidth of the transmission line. As a non-limiting example, the transmission line may include a 10 Mb/s wireless transmission line, chunk size 303 may be 65 bytes, and chunk period 304 may be 50 microseconds.

State registers 330 may include number of sent bytes 306 and overload sent bytes 307. Number of sent bytes 306 may indicate the number of bytes that have already been sent during chunk period 304. Overload sent bytes 307 may indicate a number of overload bytes used in the previous period. In some embodiments, values stored in state registers 330 may change while values of configuration registers 320 remain constant, such as over the course of one or more chunk periods 304. For example, number of sent bytes 306 may update after each message is sent within chunk period 304 and overload sent bytes 307 may update after every chunk period 304, whereas chunk size 303, chunk period 304, and/or overload size 305 may remain constant over several or all chunk periods 304. For example, rate limiter 102 may be configured to implement a fixed window counter.

In some embodiments, when a valid signal such as valid order book update 308 or valid trade update 309 from conflation module 101 is received, rate limiter 102 may be configured to determine whether the message indicated by the valid signal may be sent based on values stored in configuration registers 320 and state registers 330. For example, number of sent bytes 306, next message size 310 and overload sent bytes 307 may be summed to generate a number of bytes to be sent over chunk period 304 which would account for next message size 310. This number of bytes may be compared to a maximum allowable number of bytes which may be sent over chunk period 304, calculated as a sum of chunk size 303 and overload size 305, to determine whether the number of bytes to be sent exceeds the maximum allowable number of bytes. If the number of bytes to be sent does not exceed the maximum, the message may be sent to encoder module 103. In this case, number of sent bytes 306 may be incremented to account for the message, and an indication of a valid message to be sent may be provided to encoder module 103. If overload bytes were used, chunk period 304 may be considered to be over, and overload sent bytes 307 may be incremented to account for any extra bytes sent during chunk period 304 beyond chunk size 303.

In some embodiments, rate limiter logic 301 may take further steps based on number of sent bytes 306, next message size 310, and/or overload sent bytes 307. For example, if chunk period 304 is indicated as over, rate limiter 102 may not be ready to send any more messages until the next period. If chunk period 304 is not indicated as over and there is no other valid update from conflation module 101, an end of packet may be indicated by eop update 311 may be passed to encoder module 103 such that downstream modules (e.g., beyond framer and/or output interface) may close and send the packet. Rate limiter 102 may then wait for a new update from conflation module 101. If chunk period 304 is not indicated as over and there is another valid update indicated by conflation module 101, rate limiter 102 may determine whether to send the next update based on the sum of sent bytes 306, next message size 310, and overload sent bytes 307. If the sum is lower than chunk size 303, the new update may be sent and rate limiter 102 may iterate over the further steps again. If the sum is higher than chunk size 303 but by less than overload size 305, the message may be sent and end of packet eop update 311 may be indicated. In this case, rate limiter 102 may store the difference between the sum and chunk size 303 in overload sent bytes 307, indicate that chunk period 304 as over, and no more messages may be sent until the next period. If the sum is higher than chunk size 303 by more than overload size 305, the message may not be sent, and end of packet eop update 311 may be indicated for the previously sent message(s). In this case, rate limiter 102 may indicate chunk period 304 to be over may wait until the next period to send another message. The inventors have recognized that it may be more efficient not to send additional messages during chunk period 304 beyond the byte budget. For example, a very recent update may be received immediately thereafter which could wait one or more periods to be sent due to the decreased byte budget.

In some embodiments, when rate limiter 102 does not receive a valid update during chunk period 304, rate limiter 102 may be configured to transmit any new valid update as soon as the valid update is received without waiting for the next period. In some embodiments, rate limiter 102 may receive feedback from downstream equipment (e.g., beyond the framer and output interface).

In some embodiments, rate limiter 102 may be configured to send messages exceeding chunk size 303, for example, number of sent bytes 306 is at 0. In such cases, logic 301 may indicate end of packet eop update 311 and/or increment a register indicating a warning status. Rate limiter 102 may wait for a number of chunk periods 304, for example, equal to the size of the sent message divided by chunk size 303. Accordingly, a target bandwidth of rate limiter 102 may be maintained even when large messages should be sent quickly.

In some embodiments, rate limiter 102 may be configured to calculate a temporary reduction in chunk period 304 if chunk size 303 has not been consumed within the previous chunk period. For example, rate limiter 102 may send packets more frequently in this case without waiting for additional messages that may not arrive.

In some embodiments, rate limiter 102 may be a bandwidth shaping module that incorporating bandwidth limitation algorithms. For example, particular algorithms may be implemented depending on the nature of the device disposed between system 100 and the low bandwidth network. In some embodiments, where the available bandwidth on the transmission line is defined by chunk size 303 over chunk period 304 on the order of microseconds, system 100 may implement a particular a fixed window counter, as described herein. In some embodiments, when system 100 is coupled to a device which allows short bursts to be sent, other bandwidth shaping approaches may be implemented, such as a token bucket algorithm or other suitable algorithms. In some embodiments, rate limiter 102 may be configured to implement particular algorithms based on feedback received from a device responsible for sharing bandwidth of a wireless line (e.g., between several participants).

Returning to FIG. 1, in some embodiments, encoder module 103 may use a particular format to transmit order book, status and/or trade update messages. For example, messages may be formed using as few bytes as possible to reduce the bandwidth consumed by each update, while sending enough information such that participants do not need to wait for recovery if a packet were to be lost.

In some embodiments, a message including an order book update may include a market timestamp, a normalized status, and levels. For example, the market timestamp may indicate the time difference between the previous order book update and the update included in the message. The normalized status may be repeated in each order book update such that lost updates do not need to be recovered. The levels may include a price, quantity, and/or a number of orders with a depth of publication selected by the participant to receive the message. For a publication depth of N, a participant may choose to always receive N bid levels and N ask levels, or alternatively to receive only the side of the order book (e.g., only ask or bid) which is updated in the message. In the first case, each order book update may be self-sufficient as both ask and bid prices are provided. In the second case, the overall bandwidth used may be further reduced by comparison to the first case. The price and quantity fields may have a variable size to facilitate sending a minimum number of bytes. In case of depth N greater than 1, the first price listed on each order book side may be defined as a reference price, with other prices displayed as having prices relative to the reference price. For example, the other prices may be indicated as a difference (e.g., a delta) with respect to the reference price. In this case, the number of bytes sent may be further reduced as compared with sending each price without reference to a reference price.

In some embodiments, a message including a trade update may include a market timestamp, a number of orders, a quantity, and a price. The market timestamp may indicate a time difference between previous trade updates and the update included in the message. The number of orders may include the number of orders for a particular trade received from the market, for example in a single message from the market. Otherwise, the number of orders may include a number of aggregated trades in the update, for example across multiple messages from the market. The quantity may include a total quantity of the aggregated trades, and the price may include the price of the aggregated trades sent, using a minimum number of bytes.

In some embodiments, messages may be generated having suboptimal architectures in terms of latency in decoding the messages, for example because the architecture may include variable size fields and/or prices relative to a reference price. While the decoding delay introduced by the structure may be less than 200 ns with a basic central processing unit (CPU), each byte may take 800 ns to be serialized onto a 10 Mb/s transmission line. Accordingly, in some embodiments, message architectures may be configured to provide reduced encoding latency even further.

What is claimed is:

1. A network appliance comprising one or more digital logic hardware elements configured to:
   receive market data at the network appliance from a first location at an incoming data transfer rate; and
   transmit, from the network appliance to a second location different from the first location over a wireless transmission line, a plurality of messages based on the market data, at an outgoing data transfer rate less than or equal to a predetermined data transfer rate, wherein the one or more digital logic hardware elements comprise a rate limiter configured to set the predetermined data transfer rate based, at least in part, on a maximum data transfer rate of the wireless transmission line and regulate the outgoing data transfer rate to ensure that the outgoing data transfer rate is less than or equal to the predetermined data transfer rate,
   wherein the predetermined data transfer rate is less than the incoming data transfer rate.

2. The network appliance of claim 1, wherein the network appliance is configured to detect the maximum data transfer rate for the wireless transmission line.

3. The network appliance of claim 2, wherein the one or more digital logic hardware elements comprise an output queue configured to provide the plurality of messages for transmission by the network appliance, wherein the rate limiter is configured to provide, to the output queue, a ready signal indicating capacity for transmitting a message having a next message size, to ensure that the outgoing data transfer rate is less than or equal to the predetermined data transfer rate.

4. The network appliance of claim 1, wherein the one or more digital logic hardware elements comprise a conflation module, including:
   an order book memory configured to store updated order book information from the market data; and
   one or more trade buffers configured to store updated trade information from the market data.

5. The network appliance of claim 4, wherein the conflation module is configured to aggregate trades from first and second messages of the market data for a first financial instrument at a first price into a first message to be sent to the second location.

6. The network appliance of claim 5, wherein:
   the conflation module is configured to update a first quantity of the first financial instrument at the first price in the one or more trade buffers to include a second quantity of the first financial instrument at the first price; and
   the first quantity is indicated in the first message received at a first time and the second quantity is indicated in the second message received at a second time later than the first time.

7. The network appliance of claim 4, wherein the conflation module is configured to:
   store, in the order book memory, a first order book update for a first financial instrument;
   store, in the order book memory, a second order book update for the first financial instrument; and
   prioritize the second order book update over the first order book update in a next order book update message.

8. The network appliance of claim 4, wherein the one or more digital hardware elements comprise an encoder module configured to serialize the plurality of messages over the wireless transmission line in a manner which includes a status for each financial instrument in the order book memory.

9. The network appliance of claim 1, further comprising one or more integrated circuits including the one or more digital hardware elements.

10. The network appliance of claim 9, wherein the one or more integrated circuits comprise one or more field programmable gate arrays (FPGAs).

11. A method, comprising:
   receiving, at a network appliance from a first location at a first time at an incoming data transfer rate, a first update for a first financial instrument;
   receiving, at the network appliance from the first location at a second time later than the first time at the incoming data transfer rate, a second update for the first financial instrument;
   transmitting, from the network appliance, a message indicative of the second update to a second location different from the first location over a wireless transmission line at outgoing data transfer rate less than or equal to a predetermined data transfer rate; and
   using a rate limiter of the network appliance:
     setting the predetermined data transfer rate based on a maximum data transfer rate of the wireless transmission line; and
     regulating the outgoing data transfer rate to ensure that the outgoing data transfer rate is less than or equal to the predetermined data transfer rate,
   wherein the predetermined data transfer rate is less than the incoming data transfer rate.

12. The method of claim 11, further comprising:
   prioritizing the second update over the first update upon receiving the second update,
   wherein the first update includes a first order book update and the second update includes a second order book update.

13. The method of claim 12, wherein:
   the first order book update indicates a first bid price for the first financial instrument and the second order book update indicates a second bid price different from the first bid price; and/or
   the first order book update indicates a first ask price for the first financial instrument and the second order book update indicates a second ask price different from the first ask price.

14. The method of claim 12, further comprising:

storing, after the first time and before the second time, the first update in an order book memory; and storing, after the second time, the second update in the order book memory.

15. The method of claim 14, further comprising:

including, in the message indicative of the second update, a status update for each financial instrument in the order book memory.

16. The method of claim 14, further comprising, after transmitting the message indicative of the second update, transmitting another message including another status update for each financial instrument in the order book memory.

17. The method of claim 12, wherein prioritizing the second update over the first update comprises not transmitting a message indicative of the first update.

18. The method of claim 11, wherein:

the first update includes a first trade update for the first financial instrument; and the second update includes a second trade update for the first financial instrument.

19. The method of claim 18, wherein:

the first trade update indicates a first quantity of the first financial instrument;

the second trade update indicates a second quantity of the first financial instrument; and the message indicative of each of the second update includes a sum of the first and second quantities.

20. The method of claim 11, further comprising:

determining, at a third time later than the second time, that transmitting the message indicative of the second update would exceed the predetermined data transfer rate; and transmitting, at a fourth time later than the third time, the message indicative of the second update.

* * * * *